United States Patent [19]

Welk, Jr.

[11] 3,840,867
[45] Oct. 8, 1974

[54] FLUIDIC LIQUID SENSING SYSTEM
[75] Inventor: Horace B. Welk, Jr., Churchville, Pa.
[73] Assignee: The United States of America as represented by the Secretary of the Navy, Washington, D.C.
[22] Filed: Jan. 18, 1973
[21] Appl. No.: 324,613

[52] U.S. Cl............ 340/244 C, 137/804, 340/240
[51] Int. Cl. .......................................... G08b 21/00
[58] Field of Search.......... 340/244, 240; 200/84 R; 73/290 R, 322.5, 422 TC; 116/118 R; 137/386, 392, 403, 430, 804–806, 826, 829

[56] References Cited
UNITED STATES PATENTS

| | | | |
|---|---|---|---|
| 1,269,697 | 6/1918 | Flinn | 200/84 R |
| 1,725,875 | 8/1929 | Luhr | 73/322.5 X |
| 2,320,417 | 6/1943 | Edelmann | 73/322.5 X |
| 2,713,268 | 7/1955 | Langsenkamp | 73/422 TC |
| 3,104,678 | 9/1963 | Cole | 137/403 |
| 3,667,500 | 6/1972 | Stone | 137/386 |
| 3,746,035 | 7/1973 | Singer | 73/322.5 X |

Primary Examiner—John W. Caldwell
Assistant Examiner—Daniel Myer
Attorney, Agent, or Firm—R. S. Sciascia; Henry Hansen

[57] ABSTRACT

A liquid level sensing system comprising a pair of sensors, a fluidic logic circuit and a warning device. The sensors are placed at two preselected measurement levels within a vented reservoir, each sensor including a hollow, vertical tube with a wire mesh cage containing a buoyant ball float of a diameter larger than the tube diameter attached to the tube bottom. Constant pressure gas is connected through a fixed orifice to the upper end of each tube and flows out of the bottom opening if the ball float is displaced by the liquid level below the bottom opening of the respective tube, activating a logic circuit and warning device communicating therewith. As the liquid level rises to the bottom opening of the respective tube, the ball float seals the opening, completely blocking gas flow, increasing pressure in the tube from a minimum to a maximum and deactivating the warning device through the logic circuit.

8 Claims, 1 Drawing Figure

PATENTED OCT 8 1974 3,840,867
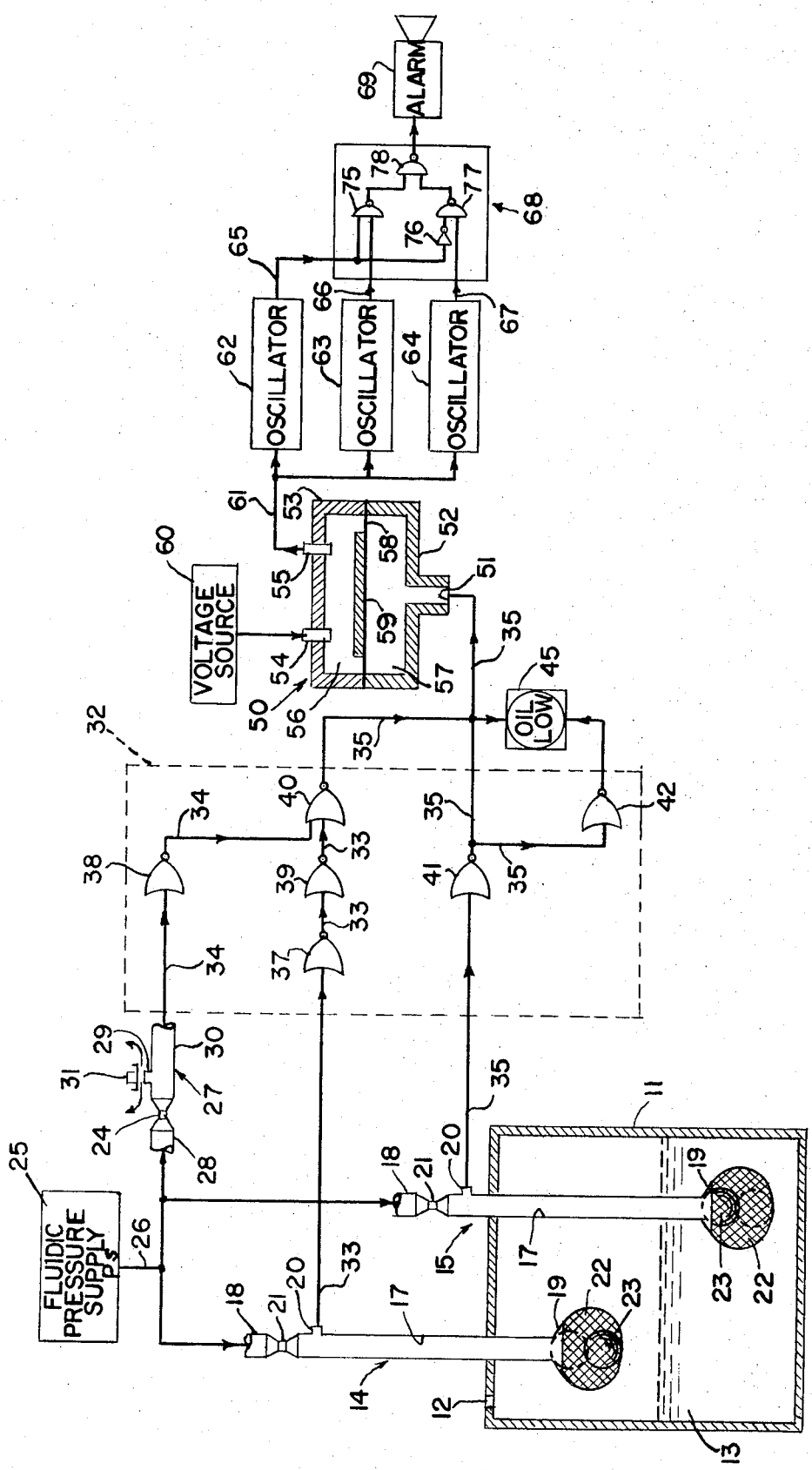

FLUIDIC LIQUID SENSING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to the field of fluid handling and more particularly to liquid level responsive systems.

Typical devices found in the prior art for detecting liquid level in reservoirs containing potentially explosive material include a variety of pneumatic systems. Heretofore, such pressure-sensitive systems typically employed pressure switches and electromechanical indicating or warning devices having relatively low sensitivity, slow response time and decreased reliability, maintainability and service life. These systems are generally relatively heavy and bulky, especially when placed within the restrictive weight and space constraints of a military aircraft.

SUMMARY OF THE INVENTION

Accordingly, it is a general purpose and object of the present invention to provide a more sensitive, lightweight, compact, reliable, maintainable, inexpensive, long-lasting fluidic sensing system for detecting preselected liquid levels in a reservoir and warning of a low condition.

These and other objects are accomplished according to the invention by a pair of hollow, vertical-tube sensors fixed at preselected measurement levels in a liquid reservoir, having first and second openings at the top and bottom of each respective tube with a third opening therebetween. Constant low pressure gas is connected to the first opening of each sensor, which has a fixed orifice between the first and third openings. A wire mesh cage containing a buoyant ball float is attached to the bottom of each tube surrounding the second opening. The respective third openings register with a fluidic logic circuit connectd to one or more warning devices for indicating a low liquid level condition.

BRIEF DESCRIPTION OF THE DRAWING

The single FIGURE is a schematic elevation view of a reservoir and liquid level sensors in combination with a fluidic logic circuit and indicator with a cross-sectional view of a converter valve constructed according to the invention.

DESCRIPTION OF THE PREFERRED EMBODIMENT

Referring now to the drawing, a reservoir 11 having a vent 12 is shown containing a liquid 13, such as lubricating oil used in a military aircraft. A pair of sensors 14 and 15, constructed according to the invention, are shown fixed within reservoir 11 at two preselected levels corresponding to remaining critical volumetric amounts of liquid. In the instant case, for example, 20 percent and 80 percent levels are chosen, the former representing that volume of lubricating oil below which immediate replenishment is necessary, and the latter representing the volume below which replenishment is necessary during the next routine maintenance period. Sensor 14, which is identical to sensor 15, comprises a hollow tube 17 disposed vertically in reservoir 11 having a first opening 18 generally at the top, a second opening 19 generally at the bottom and a third opening 20 generally formed in tube 17 between openings 18 and 19. Tube 17 is generally flared at the bottom surrounding opening 19 to form a seat or sealing surface. An orifice 21 is located in tube 17 between openings 18 and 20. Adjacent to and surrounding opening 19 is a wire mesh cage 22 demountably attached to tube 17 and containing a ball float 23 of a diameter larger than the diameter of opening 19. Float 23 may be constructed of any suitable buoyant material such as wood or plastic in such a manner that it will conform to the flared portion of tube 17 and seal opening 19 from the flow of gas therethrough when liquid 13 rises to the vertical level of opening 19. It is to be understood that a porous cage is but one method for restraining the lateral movement of float 23 so that it is aligned with opening 19 as it rises with the rising level of liquid 13. Any suitable method for guiding float 23 into opening 19 in sensors 14 and 15 is an acceptable alternative within the scope of the present invention. One such alternative method is to attach one end of an elongated rod to float 23, extending far enough into tube 17 so that its free end always remains above opening 19 even when there is no liquid in reservoir 11. It should be understood in addition that the present invention is operable without float 23, which effects positive sealing of opening 19 and allows the use of higher fluidic supply pressures without causing liquid 13 to bubble.

A fluidic pressure supply 25 is connected by a common conduit 26 to respective openings 18 of sensors 14 and 15 and to a first opening 28 in an orifice-bleed control 27. Control 27 is generally formed of a hollow tube with a second opening 30 at the opposite end from opening 28 and a third opening 29 in the wall of the tube therebetween. An orifice 24 of a diameter smaller than opening 29 is located between openings 28 and 29. A push button 31, normally located on the aircraft instrument panel adjacent opening 29 is shown in the open position with fluid from supply 25 exiting out of opening 29. When push button 31 is depressed, opening 29 is completely blocked, causing pressure at opening 30 to increase to a maximum. The function of control 27 will be more fully explained in the description of operation. Supply 25 may be any conventional means for providing fluidic pressure on the order of 2 p.s.i.

A fluidic logic circuit 32 is respectively connected by conduit 33 to opening 20 in sensor 14, by conduit 34 to opening 30 in control 27 and by conduit 35 to opening 20 in sensor 15. One example of a material used for conduits 33, 34 and 35 is flexible poly-vinylchloride tubing. Logic circuit 32 comprises a plurality of fluidic logic amplifiers including NOT gates 37, 38, 39, 41 and 42 and NOR gate 40, appropriately connected to a fluidic warning indicator 45. Indicator 45 has two inputs, an actuating input and a deactuating input. A typical indicator 45 used in the invention is a Pitney-Bowes, Model 6080009, piston-type, pop-up indicator with the words "OIL LOW" engraved on the front surface of the piston (as shown in the drawing). More specifically, opening 20 in sensor 14 is connected in series by conduit 33 to amplifiers 37 and 39 and one input of amplifier 40; opening 30 in control 27 is connected in series by conduit 34 to amplifier 38 and the second input of amplifier 40; and opening 20 in sensor 15 is connected in series by conduit 35 to amplifiers 41 and 42. Indicator 45 is connected at its actuating side to the common output of amplifiers 40 and 41, and at its deactuating side to the output of amplifier 42.

An additional or auxiliary indicating means, such as an electrically powered visual or audible means for indicating low liquid level is shown in the drawing in one of many possible embodiments. In order to convert fluidic pressure to an electrical signal a converter valve 50 is connected at an inlet port 51 in a first split housing 52 to the common output from amplifiers 40 and 41 by conduit 35. Valve 50 further includes input terminal 54 and output terminal 55 fixed in a second split housing 53 and protruding therethrough into an upper cavity 56. Housings 52 and 53 are appropriately joined together to form valve 50. Disposed between respective housings 52 and 53 and separating upper cavity 56 from a lower cavity 57 is an elastomeric diaphragm 58 having a plate 59 of a metallic conducting material fixed thereto and extending into cavity 56. Plate 59 is disposed adjacent terminals 54 and 55 in close proximity for the purpose of electrically connecting terminals 54 and 55 when fluidic pressure entering port 51 into cavity 57 displaces diaphragm 58 sufficiently to force plate 59 to simultaneously contact terminals 54 and 55. A standard 5 volt voltage source 60 is connected to terminal 54, and terminal 55 is connected in parallel to each of respective solid state oscillators 62, 63 and 64 by wire 61. Oscillator 62 produces a timing pulse at a rate of 0.75 Hz; oscillator 63 produces an audible output frequency of 660 Hz, which has the sound of the musical note $E^2$; and oscillator 64 produces an audible output at a frequency of 400 Hz, which has the sound of the musical note $A^1$. Oscillators 63 and 64 when sounded alternately at a frequency of 0.75 Hz produce a sound similar to the familiar warning sound used on certain European police cars and ambulances. Oscillators 62, 63 and 64 are respectively connected in parallel to an electronic frequency sequencer 68 which sequentially emits the 440 Hz and 660 Hz signals at a rate of 0.75 seconds per cycle. The 660 Hz output from oscillator 63 is connected to one input of a first NAND gate 75 by a wire 66, and the 440 Hz output from oscillator 64 is similarly connected to one input of a second NAND gate 77 by a wire 67. The 0.75 Hz timing pulse is connected in parallel to the second input of gate 75 and to the second input of gate 77 via an inverter 76 by a wire 65. The outputs of gates 75 and 77 are connected to the input of a third NAND gate 78. The resultant output from gate 78 (i.e., sequencer 68) is connected to an alarm 69, such as a pilot's headset, in order to provide audible warning of a low liquid level condition.

Operation of the system will now be summarized. When reservoir 11 is filled with liquid 13 to the arbitrarily chosen 80 percent level, floats 23 are raised by the buoyant force of the liquid against the flared ends of tubes 17 to seal respective openings 19 in sensors 14 and 15. Constant gas pressure $P_s$ at approximately 2 p.s.i. from supply 25 cannot exit out of openings 19, and thus pressure builds up to a maximum downstream from orifices 21 at openings 20 in sensors 14 and 15. Amplifier 41 input is at the high or 1 state, and output at the low or 0 state is connected to the input of amplifier 42 and to the actuating side of indicator 45. A 0 input to the actuating side of indicator 45 does not cause the piston to pop up. A 0 input to amplifier 42 produces a 1 output to the deactuating side of indicator 45 which positively holds the piston in the down position. As a result the "OIL LOW" inscription on the piston is not visible, indicating that the liquid is at least above the lower or 20 percent level. Similarly, amplifier 37 input is at the 1 state, and output at the 0 state is connected to amplifier 39 input whose output is 1 and is connected to one input of amplifier 40. In order to detect liquid at any point above the 20 percent level it is necessary to cover opening 29 in control 27 by depressing push button 31 in order to provide a second input to NOR gate amplifier 40. This is referred to as the "press to test" feature of the system. By sealing opening 29, fluid from supply 25 enters control 27 through opening 28 and orifice 24 and resultant pressure builds up to a maximum at opening 30, producing a 1 state at the input to amplifier 38. The output of amplifier 38 and thus the second input to amplifier 40 is at the 0 state. With 0 and 1 inputs to NOR gate amplifier 40, its output is at the 0 state and thus combined with the 0 output from amplifier 41, indicator 45 is not actuated, providing information that the liquid is above the 80 percent level as well as the 20 percent level.

When liquid 13 in reservoir 11 is between the 20 percent and 80 percent levels, the description of operation for sensor 15 remains the same and indicator 45 is not automatically actuated. Fluid flows out of opening 19 in sensor 14 and amplifier 37 input is now at the 0 state. Output at the 1 state is connected to amplifier 39 input, whose output is 0 and is connected to one input of amplifier 40. Since the other input from control 27 to amplifier 40 is 0 when push button 31 is depressed, its output is now 1 actuating indicator 45 and providing visual information that the liquid is below the 80 percent level, but still not below the 20 percent level.

When liquid 13 is below the 20 percent level, fluid flows out of opening 19 in sensor 15 and amplifier 41 input is at the 0 state. Output at the 1 state automatically actuates indicator 45 warning that the liquid is below the 20 percent level. Amplifier 42 input is 1 and output is 0, thus failing to provide a positive signal to deactuate indicator 45.

Operation of the electrically powered audible indicating means requires conversion of the fluidic pressure signal to an electrical signal by converter valve 50. When output from either amplifier 40 or 41 is at the 1 state, pressure in cavity 57 exerts a force on diaphragm 58 causing plate 59 to simultaneously contact terminals 54 and 55. Voltage at terminal 54 is conducted through plate 59 to terminal 55 and energizes oscillators 62, 63 and 64 producing the audible signals which are sequentially emitted through sequencer 68 to an alarm 69.

Some of the many advantages of the present invention should now be readily apparent. The fluidic sensing and logic system is extremely sensitive, responsive, accurate and reliable having a greatly increased service life over electrical analog systems. It is inexpensive to construct and maintain, lightweight and compact. In an aircraft environment the fluidic sensing system is particularly advantageous in that it is unaffected by shock and vibration, and it neither transmits nor is susceptible to radio noise as are electromechanical devices such as relays and switches. In a potentially explosive environment such as an oil or gasoline reservoir the fluidic sensing system is completely safe.

Obviously many modifications and variations of the present invention are possible in light of the above teaching. It is therefore to be understood that within the scope of the appended claims the invention may be practiced otherwise than as specifically described.

What is claimed is:

1. A liquid level condition sensing system for a container comprising, in combination:

sensor means including an elongated tube adapted to be fixed vertically in the container having first, second and third openings communicating with each other therein, said second opening having a flared portion adjacent thereto communicating with the liquid at a preselected level, said third opening being intermediate said first and said second opening along the length of said tube, and having an orifice between said first and said third opening, a vented housing operatively secured to and surrounding said tube adjacent said second opening and a ball float captively contained within said housing and adapted to sealingly engage said flared portion when the liquid level approaches said second opening for obstructing the flow of fluid therefrom;

fluidic pressure supply means operatively connected to said first opening; and fluidic logic means including first and second NOT gate fluidic amplifiers operatively connected in series, the input to said first amplifier being operatively connected to said sensor means third opening, and fluidic display means having an actuating and a deactuating port, the output from said first amplifier being operatively connected to the actuating port and the output from said second amplifier being operatively connected to the deactuating port.

2. A level sensing system as set forth in claim 1, further comprising:

said display means including means for converting fluidic pressure to an electrical signal having a fluidic input port and electrical input and output terminals operatively connected at said input port to the output from said first amplifier, a voltage source operatively connected to said converter means input terminal, a plurality of oscillators operatively connected in parallel at their inputs to said converter means output terminal for producing a timing signal and an audible signal, sequencer means having a plurality of inputs and an output operatively connected at said inputs to the respective outputs from said oscillators for intermittently emitting the audible signal, and alarm means operatively connected to said sequencer means output for displaying the audible signal.

3. A liquid level condition sensing system for a container comprising, in combination:

a plurality of sensor means adapted to be placed in the container each having first, second and third openings communicating with each other therein, said second openings communicating with the liquid at different preselected levels, and an orifice between said first and said third opening;

control means disposed outside of the container having first, second and third openings communicating with each other therein, said second opening communicating with the atmosphere, and an orifice between said first and said second opening;

fluidic pressure supply means operatively connected to said sensor means and said control means first opening; and fluidic logic means operatively connected to said sensor means and said control means third opening for indicating the liquid level condition.

4. A level sensing system as set forth in claim 3, further comprising:

said sensor means each including ball float means formed to be captively guided to said second opening for obstructing the flow of fluid therefrom when the liquid level approaches said second opening.

5. A level sensing system as set forth in claim 4, further comprising:

said sensor means including first and second elongated tubes each fixed vertically in the container having a flared portion adjacent said second opening and having said third opening between said first and said second opening along the length of said tube.

6. A level sensing system as set forth in claim 5, further comprising:

said ball float means including a vented housing operatively secured to and surrounding each of said tubes adjacent said second opening and a ball float adapted to sealingly engage said flared portion being captively contained within said housing.

7. A level sensing system as set forth in claim 6, further comprising:

said fluidic logic means including first and second NOT gate fluidic amplifiers operatively connected in series, the input to said first amplifier being operatively connected to said first tube third opening, fluidic display means having an actuating and a deactuating port, the output from said first amplifier being operatively connected to the actuating port and the output from said second amplifier being operatively connected to the deactuating port, third and fourth NOT gate fluidic amplifiers operatively connected in series, the input to said third amplifier being operatively connected to said second tube third opening, a fifth NOR gate fluidic amplifier and a sixth NOT gate fluidic amplifier, the input to said sixth amplifier being operatively connected to said control means third opening and the output from said sixth amplifier being operatively connected to a first input to said fifth amplifier a second input thereto being operatively connected to the output from said fourth amplifier, and the output from said fifth amplifier being operatively connected to said display means actuating port.

8. A level sensing system as set forth in claim 7, further comprising:

said display means including means for converting fluidic pressure to an electrical signal having a fluidic input port and electrical input and output terminals operatively connected at said input port to the common outputs from said first and said fifth amplifiers, a voltage source operatively connected to said converter means input terminal, a plurality of oscillators operatively connected in parallel at their inputs to said converter means output terminal for producing a timing signal and an audible signal, sequencer means having a plurality of inputs and an output operatively connected at said inputs to the outputs from said oscillators for intermittently emitting the audible signal, and alarm means operatively connected to said sequencer means output for displaying the audible signal.

* * * * *